(12) United States Patent
Yamazaki et al.

(10) Patent No.: US 6,262,782 B1
(45) Date of Patent: Jul. 17, 2001

(54) REFLECTIVE LCD HAVING POLARIZED LIGHT SEPARATOR AND PHASE PLATE ON A LIGHT-INCIDENT-SIDE

(75) Inventors: Tsuneo Yamazaki, Kyongsangnam-do; Hong-Sik Park, Pusan-shi, both of (KR)

(73) Assignee: Samsung SDI Co. Ltd. (KR)

( * ) Notice: Subject to any disclaimer, the term of this patent is extended or adjusted under 35 U.S.C. 154(b) by 0 days.

(21) Appl. No.: 09/489,044

(22) Filed: Jan. 21, 2000

(30) Foreign Application Priority Data

Jan. 30, 1999 (KR) .................................................. 99-3024

(51) Int. Cl.[7] .......................... G02F 1/1335; G03B 4/19; G02B 5/30
(52) U.S. Cl. ................... 349/9; 349/113; 349/3; 353/20; 359/495
(58) Field of Search ................. 349/9, 113, 117; 359/487, 495, 493; 353/20

(56) References Cited

U.S. PATENT DOCUMENTS

| 5,587,816 | * | 12/1996 | Gunjima et al. | 349/9 |
| 5,712,694 | * | 1/1998 | Taira et al. | 349/9 |
| 5,898,521 | * | 4/1999 | Okada | 349/9 |

* cited by examiner

Primary Examiner—Toan Ton
(74) Attorney, Agent, or Firm—Baker & McKenzie

(57) ABSTRACT

A reflective LCD includes first and second substrates facing each other, a liquid crystal layer disposed between the upper and lower substrates, a high transmissive polarizer attached on an outer surface of the first substrate, and an optical system disposed on the high transmissive polarizer. The high transmissive polarizer allows a part of incident light to pass and reflecting the rest of the incident light. The optical system returns the reflected light to the high transmissive polarizer after changing an advancing direction of the reflected light to a polarizing direction such that the reflected light can be transmitted through the high transmissive polarizer.

8 Claims, 3 Drawing Sheets

REFLECTIVE LCD HAVING POLARIZED LIGHT SEPARATOR AND PHASE PLATE ON A LIGHT-INCIDENT-SIDE

BACKGROUNDS OF THE INVENTION

1. Field of the Invention

The present invention relates to a reflective liquid crystal display and, more particularly, to a reflective liquid crystal display which can enhance light efficiency.

2. Description of the Prior Art

Generally, a liquid crystal display ("LCD") is classified into a transmissive type and a reflective type: the former uses a backlight for radiating light frontward, while the latter uses a reflective film disposed on a rear side of the LCD to reflect light transmitted from a front side.

FIG. 4 shows a sectional view of a conventional reflective LCD.

A conventional LCD comprises upper and lower substrates 2A and 2B facing each other, ITO electrodes 4A and 4B formed on opposing inner surfaces of the upper and lower substrates 2A and 2B, respectively, and a liquid crystal layer 6 disposed between the upper and lower substrates 2A and 2B.

Attached on outer surfaces of the upper and lower substrates 2A and 2B are a polarizer 8 and a reflective layer 10, respectively.

In addition, a red R, green G and blue B color filter with a black matrix BM may further provided to realize a color display.

In the operation of the LCD, when electric field is generated between the upper and lower ITO electrodes 4A and 4B by applying driving signals, the orientation of liquid crystal molecules in the liquid crystal layer 6 changes in accordance with a direction of the electric field to selectively transmit light.

Describing the transmission of the light, outer incident light is changed from circular polarization into linear polarization while passing through the polarizer 8, and the linear polarization is changed into elliptical polarization while passing through the liquid crystal layer 6 via the upper substrate 2A, the RGB color filter, and the ITO electrode 4A. Then, the elliptical polarization passes through the ITO electrode 4B and the lower substrate 2B, then is reflected on the reflect layer 10.

The reflected light is projected through the polarizer 8 in reverse order of the light incident course, thereby displaying an image.

FIG. 5 shows a schematic diagram for illustrating changes in an amount of light passing through the elements of the conventional LCD.

When outer light is introduced into the polarizer 8, 50% of the light ("S-wave") is absorbed and disappeared by the polarizer, and 50% of the light ("P-wave") is transmitted to the reflective layer 10 via the liquid crystal layer 6, then reflected thereon to be projected to the outside.

That is, 50% of the light is disappeared in the polarizer 8. Therefore, the light efficiency of the LCD becomes about 50%. Light wave indicated by P' in the drawing is the P-wave directed to the outside.

As described above, since the light efficiency is low, the image to be displayed is not clear. Therefore, many methods have been proposed to solve the above-described problems.

One of the methods is to use a high transmissive polarizer, which is sold in the trademark of DEBF polarizer by 3M Company.

However, even if the high transmissive polarizer is used, there is limitation in improving the light efficiency.

SUMMARY OF THE INVENTION

Therefore, the present invention has been made in an effort to solve the above-described problem of the prior art.

It is an objective of the present invention to provide an LCD which can provide a high light efficiency by reducing an amount of light which is disappeared in a polarizer.

To achieve the above objective, the present invention provides a reflective LCD comprises first and second substrates facing each other, a liquid crystal layer disposed between the upper and lower substrates, a high transmissive polarizer attached on an outer surface of the first substrate, the high transmissive polarizer allowing a part of incident light to pass and reflecting the rest of the incident light, and an optical system disposed on the high transmissive polarizer, the optical system transmitting the reflected light to the high transmissive polarizer after changing an advancing direction of the reflected light to a polarizing direction such that the reflected light can be transmitted through the high transmissive polarizer.

According to a preferred example of the present invention, the optical system comprises an optical plate for transmitting light, which is reflected from the high transmissive polarizer, to a side wall thereof and for transmitting again the light transmitted from the side wall to the high transmissive polarizer, a retardation plate attached on the side wall of the optical plate to allow for λ/4 phase retardation of the light transmitted from the optical plate, and an optical reflecting plate attached on the retardation plate.

BRIEF DESCRIPTION OF THE DRAWINGS

The accompanying drawings, which are incorporated in and constitute a part of the specification, illustrate an embodiment of the invention, and, together with the description, serve to explain the principle of the invention.

DETAILED DESCRIPTION OF THE PREFERRED EMBODIMENT

A preferred embodiment of the present invention will be described with reference to the accompanying drawings.

Figure 1:
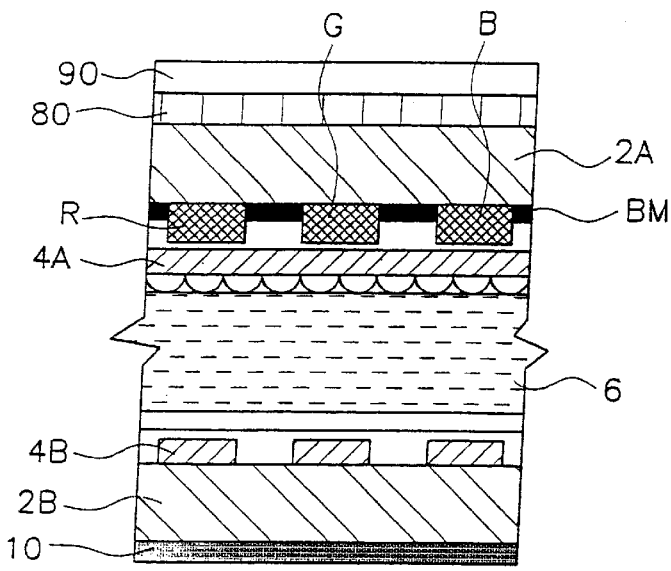
FIG. 1 is a sectional view of an LCD according to a preferred embodiment of the present invention.

FIG. 1 shows a sectional view of a reflective LCD according to a preferred embodiment of the present invention.

The inventive reflective LCD comprises upper and lower substrates 2A and 2B facing each other, ITO electrodes 4A and 4B formed on opposing inner surfaces of the upper and lower substrates 2A and 2B, respectively, and a liquid crystal layer 6 disposed between the upper and lower substrates 2A and 2B.

Attached on outer surface of the lower substrate 2B is a reflective layer 10. In addition, a red R, green G and blue B color filter with a black matrix BM may further provided to realize a color display.

As a feature of the present invention, a high transmissive polarizer 80 is attached on an outer surface of the upper substrate 2A, and an optical system 90 is disposed on the high transmissive polarizer 80.

When outer light is fully transmitted through the optical system 90, part of the transmitted light is reflected on the high transmissive polarizer 80. At this point, the optical system 90 of the present invention returns the reflected light to the high transmissive polarizer 80 after changing an advancing direction of the reflected light to a polarizing direction in which the reflected light can be transmitted through the high transmissive polarizer 80.

The high transmissive polarizer 80 is designed to allow a P-wave to pass therethrough and an S-wave to be reflected thereon. As described in the above, a normal polarizer makes the S-wave disappeared therein.

Figure 2:
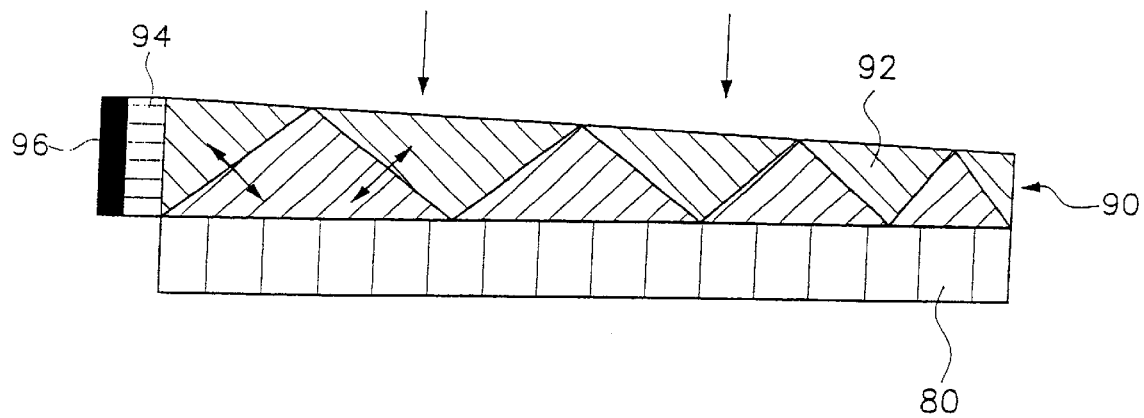
FIG. 2 is a schematic diagram illustrating an optical system of an LCD according to a preferred embodiment of the present invention.

Referring to FIG. 2, there is shown a detailed view of the optical system 90.

As shown in the drawing, the optical system 90 comprises an optical plate 92 for transmitting light, which is reflected from the high transmissive polarizer 80, to a side wall thereof and for transmitting again the light transmitted from the side wall to the high transmissive polarizer 80, a retardation plate 94 attached on the side wall of the optical plate 92 to allow for λ/4 phase retardation of the light transmitted from the optical plate 92, and an optical reflecting plate 96 attached on the retardation plate 94.

The operation of the above-described transmissive LCD will be described more in detail with reference to FIGS. 1 and 2.

When drive signals are applied to the ITO electrodes 2A and 2B, light is selectively transmitted through the liquid crystal layer 6 as orientations of liquid crystal molecules are shifted according to an electric field formed between the ITO electrodes 2A and 2B.

That is, outer light fully passes through the optical plate 92 of the optical system 90. Then, part of the outer light, which has passed through the optical plate 92, passes through the high transmissive polarizer 80, then is transmitted to the reflective layer 10 through the upper substrate 2A, the ITO electrode 4A, the liquid crystal layer 6, the ITO electrode 4B, and the lower substrate 2A in this order and reflected on the reflective layer 10.

The reflected light is projected to the outside through the optical plate 92 of the optical system 90 via the lower substrate 2B, the ITO electrode 4B, the liquid crystal layer 6, the ITO electrode 4A, the upper substrate 2A, and the high transmissive polarizer 80 in this order.

In addition, the rest of the light, which does not pass through the high transmissive polarizer 80 but is reflected, is returned to the high transmissive polarizer 80 by the optical system 90, thereby enhancing light efficiency of the LCD.

This will be described more in detail with reference to FIG. 3.

When the outer light is directed to the high transmissive polarizer 80 through the optical plate 92 of the optical system 90, the P-wave passes through the high transmissive polarizer 80 while the S-wave is reflected on the high transmissive plarizer 80. The reflected S-wave passes through the retardation plate 94 via the optical plate 92 of the optical system 90, then is returned to the optical plate 92 via the retardation plate 94 by being reflected on the optical reflective plate 96.

At this point, the S-wave is converted into secondary incident light defined by a $S_2$-wave and a $P_2$-wave while passing through the retardation plate 94 two times. The secondary incident light is directed again to the high transmissive polarizer 80.

The $P_2$-wave of the secondary incident light is projected to the outside via the same path as that of the P-wave. In addition, the $S_2$-wave is converted into third incident light defined by $S_3$-wave and $P_3$-wave via the same path as that of the S-wave. As a result, a total amount of the incident light becomes $P+P_2+P_3+ \ldots Pn$. An amount of $P_2+P_3+ \ldots$ is almost the same as that of the S-wave.

Figure 3:
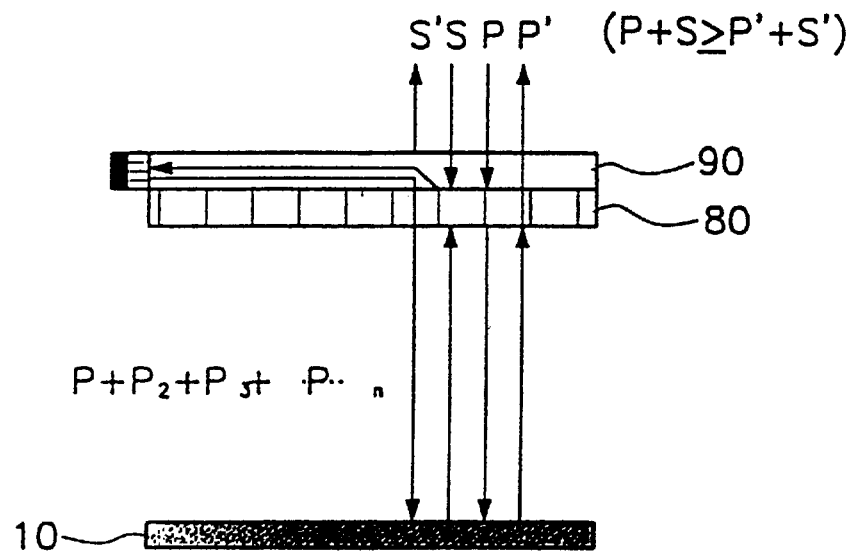
FIG. 3 is a schematic diagram for illustrating changes in an amount of light passing through elements of an LCD according to a preferred embodiment of the present invention.
Figure 4:
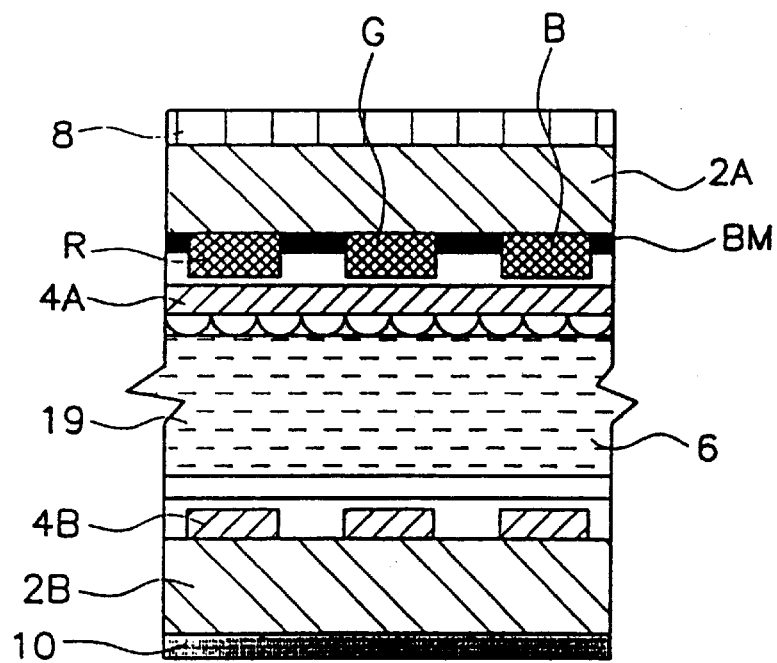
FIG. 4 is a sectional view of a convention LCD.
Figure 5:
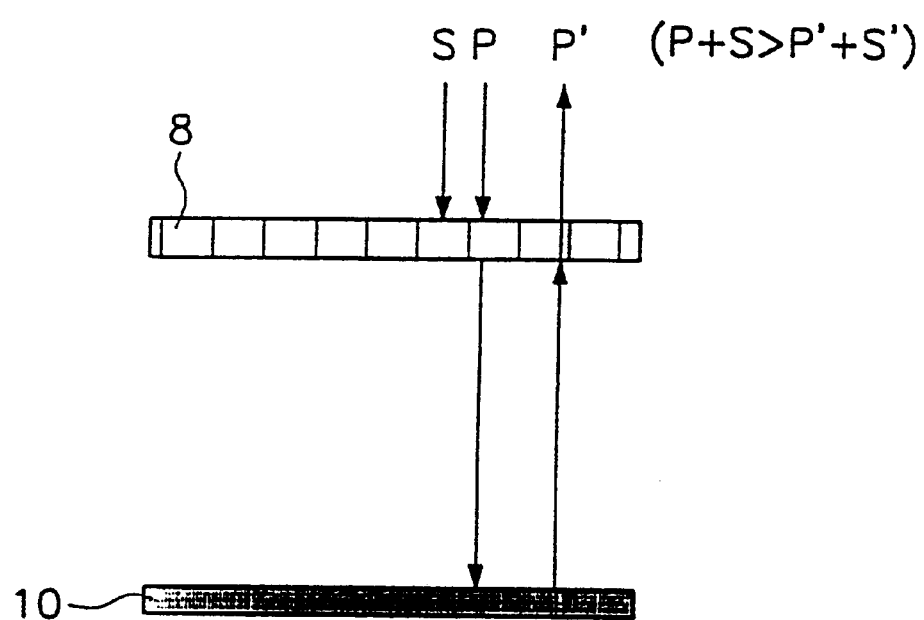
FIG. 5 is a schematic diagram for illustrating changes in an amount of light passing through the elements of the conventional LCD.

Accordingly, as shown in FIG. 3, the total amount of light projected to the outside becomes P'+S' which is slightly lower than or the almost same as that of the incident light defined by the P-wave and the S-wave.

As described above, since an amount of the project light is the almost same as that of the incident light, the light efficiency can be greatly improved when compared with the conventional art.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A reflective LCD comprising:

first and second substrates facing each other;

a liquid crystal layer disposed between the first and second substrates;

a high transmissive polarizer attached on a light-emitting side of the first substrate, the high transmissive polarizer allowing a part of incident light to pass and reflecting the rest of the incident light; and an optical system disposed on the high transmissive polarizer, the optical system transmitting the reflected light to the high transmissive polarizer after changing an advancing direction of the reflected light to a polarizing direction such that the reflected light can be transmitted through the high transmissive polarizer.

2. The reflective LCD of claim 1 wherein the optical system comprises an optical plate for transmitting light, which is reflected from the high transmissive polarizer, to a side wall thereof and for transmitting again the light transmitted from the side wall to the high transmissive polarizer, a retardation plate attached on the side wall of the optical plate to allow for $\lambda/4$ phase retardation of the light transmitted from the optical plate, and an optical reflecting plate attached on the retardation plate.

3. The reflective LCD of claim 1, wherein the optical system is disposed on a light-emitting side of the high transmissive polarizer.

4. A reflective LCD comprising:

first and second substrates facing each other;

a liquid crystal layer disposed between the first and second substrates;

a high transmissive polarizer attached on a light-emitting side of the first substrate, the high transmissive polarizer allowing a first amount of incident light to pass and reflecting the second amount of incident light; and an optical plate disposed on the high transmissive polarizer, the optical plate including a side wall and structured to transmit light which is reflected from the high transmissive polarizer to the side wall.

5. The reflective LCD of claim 4, further including a retardation plate attached to the side wall, the retardation plate structured to retard the light transmitted to the side wall.

6. The reflective LCD of claim 5, further including an optical reflecting plate attached to the retardation plate, the optical reflecting plate structured to reflect light transmitted though the retardation plate.

7. The reflective LCD of claim 4, wherein the optical plate is disposed on a light-emitting side of the high transmissive polarizer.

8. The reflective LCD of claim 4, wherein the retardation plate is a $\lambda/4$ phase retardation plate.

* * * * *